United States Patent
Sivakumar et al.

(10) Patent No.: US 12,468,892 B2
(45) Date of Patent: Nov. 11, 2025

(54) CROWD WISDOM BASED UNIVERSAL CONVERSATIONAL SYSTEM

(71) Applicant: Tata Consultancy Services Limited, Mumbai (IN)

(72) Inventors: Narendran Sivakumar, London (GB); Sankaranarayanan Viswanathan, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 304 days.

(21) Appl. No.: 18/336,920

(22) Filed: Jun. 16, 2023

(65) Prior Publication Data

US 2024/0095453 A1  Mar. 21, 2024

(30) Foreign Application Priority Data

Sep. 15, 2022  (IN) .............................. 202221052793

(51) Int. Cl.
 *G06F 40/30* (2020.01)
 *G06F 16/3329* (2025.01)
 (Continued)

(52) U.S. Cl.
 CPC ............ *G06F 40/295* (2020.01); *G06F 40/30* (2020.01); *G06F 40/35* (2020.01); *G06F 40/40* (2020.01);
 (Continued)

(58) Field of Classification Search
 None
 See application file for complete search history.

(56) References Cited

U.S. PATENT DOCUMENTS 10,880,237 B2  12/2020 Anger et al.
2018/0053119 A1 *  2/2018 Zeng ................... H04M 3/5183
(Continued)

FOREIGN PATENT DOCUMENTS

IN  201821015372 A  4/2018
WO  WO-2021086221 A1 *  5/2021  ............. G06F 40/35

OTHER PUBLICATIONS

Jan Pichl, Petr Marek, Jakub Konrád, Martin Matulík, Hoang Long Nguyen, Jan Šedivý; Alquist: The Alexa Prize Socialbot; Apr. 18, 2018; URL: https://arxiv.org/pdf/1804.06705 (Year: 2018).*
(Continued)

*Primary Examiner* — Richa Sonifrank
(74) *Attorney, Agent, or Firm* — FINNEGAN, HENDERSON, FARABOW, GARRETT & DUNNER LLP (57) ABSTRACT

Conversational systems are intelligent machines that can understand language and conversing with a customer in writing or verbally. Embodiments herein provide a method for generating a universal conversational system using an ensemble of chatbots and a universal conversational system that adopts wisdom of crowd manifesting as an ensemble of chatbots. The ensemble of chatbots takes responses from NER and rule based conversational models. The knowledge based conversation models where complex queries that require question and answer, and the ensemble of generative knowledge chatbots are relying on a pre-trained models. The pre-trained models are complemented by domain specific training to answer queries that fall outside rule-based chatbot or knowledge graph-based conversation bot capability. The universal conversational system capable of building online virtuous automated learning loop where the models learn from each other and also from human response as wisdom of crowd.

8 Claims, 3 Drawing Sheets

(51) Int. Cl.
*G06F 40/295* (2020.01)
*G06F 40/35* (2020.01)
*G06F 40/40* (2020.01)
*G06F 40/56* (2020.01)
*G06N 20/00* (2019.01)
*G06N 20/20* (2019.01)
*H04L 51/02* (2022.01)

(52) U.S. Cl.
CPC .............. *G06F 40/56* (2020.01); *H04L 51/02* (2013.01); *G06F 16/3329* (2019.01); *G06N 20/00* (2019.01); *G06N 20/20* (2019.01)

(56) References Cited

U.S. PATENT DOCUMENTS

| | | | | |
|---|---|---|---|---|
| 2020/0057811 | A1* | 2/2020 | Seegan | G06F 40/253 |
| 2021/0243300 | A1* | 8/2021 | Segalis | G06F 40/205 |
| 2021/0350263 | A1 | 11/2021 | Koneru et al. | |
| 2022/0094649 | A1* | 3/2022 | Le | G06F 40/30 |
| 2022/0100961 | A1* | 3/2022 | Vishnoi | G06F 40/35 |
| 2024/0061834 | A1* | 2/2024 | Tangari | G06F 16/24522 |
| 2024/0265041 | A1* | 8/2024 | Rennie | G06N 5/04 |
| 2025/0133051 | A1* | 4/2025 | Kumar | G06Q 10/10 |
| 2025/0183476 | A1* | 6/2025 | Jang | G01N 21/8422 |

OTHER PUBLICATIONS

Sougata Saha, Souvik Das, Elizabeth Soper, Erin Pacquetet, Rohini K. Srihari; Proto: A Neural Cocktail for Generating Appealing Conversations; Sep. 6, 2021; URL: https://arxiv.org/pdf/2109.02513 (Year: 2021).*

Subramaniam, Sethuramalingam et al., "COBOTS—A Cognitive Multi-Bot Conversational Framework for Technical Support", Title of the item: Industrial Applications, Date: Jul. 2018, pp. 597-604, Publisher: ACM, Link: https://ifaamas.org/Proceedings/aamas2018/pdfs/p597.pdf.

Cuayahuitl, Heriberto et al., "Ensemble-Based Deep Reinforcement Learning for Chatbots", Title of the item: Machine Learning, Date: Aug. 2019, Publisher: Arxiv, Link: https://arxiv.org/pdf/1908.10422.pdf.

* cited by examiner

CROWD WISDOM BASED UNIVERSAL CONVERSATIONAL SYSTEM

CROSS-REFERENCE TO RELATED APPLICATIONS AND PRIORITY

This U.S. patent application claims priority under 35 U.S.C. § 119 to Indian Application number 202221052793, filed on Sep. 15, 2022. The entire contents of the aforementioned application are incorporated herein by reference.

TECHNICAL FIELD

The disclosure herein generally relates to the field of conversational system and more specifically, to a universal conversational system adopting wisdom of crowd.

BACKGROUND

Conversational systems are an example of Artificial Intelligence (AI) Infused Applications (AIIA), Conversational systems are especially important as they are often the first interaction of clients with a business and are the entry point of a business into the AI world. In the current scenario, conversational systems are rule based or entity based or based on knowledge models. The training of conversational systems and models is manual. Both of these inadequacies result in conversational systems that are siloed, severely knowledge inhibited, cannot be a universal system that can handle all kinds of conversations and suffers from slow manual training approach resulting in lower conversational quality and higher time to market for new classes of conversations.

Mostly, industrial applications of conversational systems are fully rule driven or natural language generation (NLG) driven backed by knowledge systems. However, both approaches ignore the tacit human knowledge captured in unstructured transcripts and in addition, ignore the potential benefits of having one approach to inform and improve upon the other one.

SUMMARY

Embodiments of the disclosure present technological improvements as solutions to one or more of the above-mentioned technical problems recognized by the inventors in conventional systems. For example, in one embodiment, a universal conversational system that adopts wisdom of crowd approach and manifesting as a super ensemble generative chatbot is provided.

In one aspect, a processor-implemented method for generating a universal conversational system using an ensemble of chatbots. The processor-implemented method comprising receiving a natural language query from a user, processing the received query to obtain a plurality of queries in accordance with the one or more formats of a plurality of chatbots, extracting at least one entity from the processed query for the named-Entity Recognition (NER) chatbot and the knowledge graph-based chatbot, identifying at least one intent of the query derived by phrasing sentence construction and kind of phrasing employed, generating at least one response from each of the plurality of chatbots using a supercharged transformer architecture of a supercharged ensemble chatbot, determining a quality score of the generated at least one response from each of the plurality of chatbots using a quality assurance function, creating a composite score rating in a descending order of the determined quality score of at least one response from each of the plurality of chatbots and sharing the at least one response from the created a composite score rating with the user having score above the predefined threshold.

In another aspect, a universal conversational system that adopts wisdom of crowd manifesting as a super ensemble generative chatbot is provided. The universal conversational system includes an input/output interface configured to receive a natural language query from a user one or more hardware processors and at least one memory storing a plurality of instructions, wherein the one or more hardware processors are configured to execute the plurality of instructions stored in the at least one memory.

Further, the universal conversational system is configured to process the received query to obtain a plurality of queries in accordance with the one or more formats of a plurality of chatbots, extract at least one entity from the processed query for the named-Entity Recognition (NER) chatbot and the knowledge graph-based chatbot, identify at least one intent of the query derived by phrasing sentence construction and kind of phrasing employed, generate at least one response from each of the plurality of chatbots using a supercharged transformer architecture of a supercharged ensemble chatbot, determine a quality score of the generated at least one response from each of the plurality of chatbots using a quality assurance function, create a composite score rating in a descending order of the determined quality score of at least one response from each of the plurality of chatbots and share the at least one response from the created composite score rating with the user having score above the predefined threshold.

In yet another aspect, one or more non-transitory machine-readable information storage mediums are provided comprising one or more instructions, which when executed by one or more hardware processors causes a method for generating a universal conversational system using an ensemble of chatbots. The processor-implemented method comprising receiving a natural language query from a user, processing the received query to obtain a plurality of queries in accordance with the one or more formats of a plurality of chatbots, extracting at least one entity from the processed query for the named-Entity Recognition (NER) chatbot and the knowledge graph-based chatbot, identifying at least one intent of the query derived by phrasing sentence construction and kind of phrasing employed, generating at least one response from each of the plurality of chatbots using a supercharged transformer architecture of a supercharged ensemble chatbot, determining a quality score of the generated at least one response from each of the plurality of chatbots using a quality assurance function, creating a composite score rating in a descending order of the determined quality score of at least one response from each of the plurality of chatbots and sharing the at least one response from the created a composite score rating with the user having score above the predefined threshold.

It is to be understood that the foregoing general descriptions and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Conversational systems are rule based or entity based, or knowledge based models. In a real business scenario, the conversational system needs to rely on all three kinds of conversational technologies. The training of conversational systems and models need human intervention. Both of these inadequacies result in conversational systems that are siloed, severely knowledge inhibited, cannot be a universal system that can handle all kinds of conversations and suffers from slow manual training approach resulting in lower conversational quality and higher time to market for new classes of conversations.

The embodiments herein provide a method for generating a universal conversational system using an ensemble of chatbots and a universal conversational system that adopts wisdom of crowd manifesting as an ensemble of chatbots. The ensemble of chatbots takes responses from a named-Entity Recognition (NER) and rule based conversational models. The knowledge based conversation models where complex queries that require question and answer, and the ensemble of generative knowledge chatbots are relying on a pre-trained models. The pre-trained models are complemented by domain specific training to answer queries that fall outside rule-based chatbot or knowledge graph-based conversation chatbot capability. The universal conversational system capable of building online virtuous automated learning loop where the models learn from each other and also from human response as wisdom of crowd.

Figure 1:
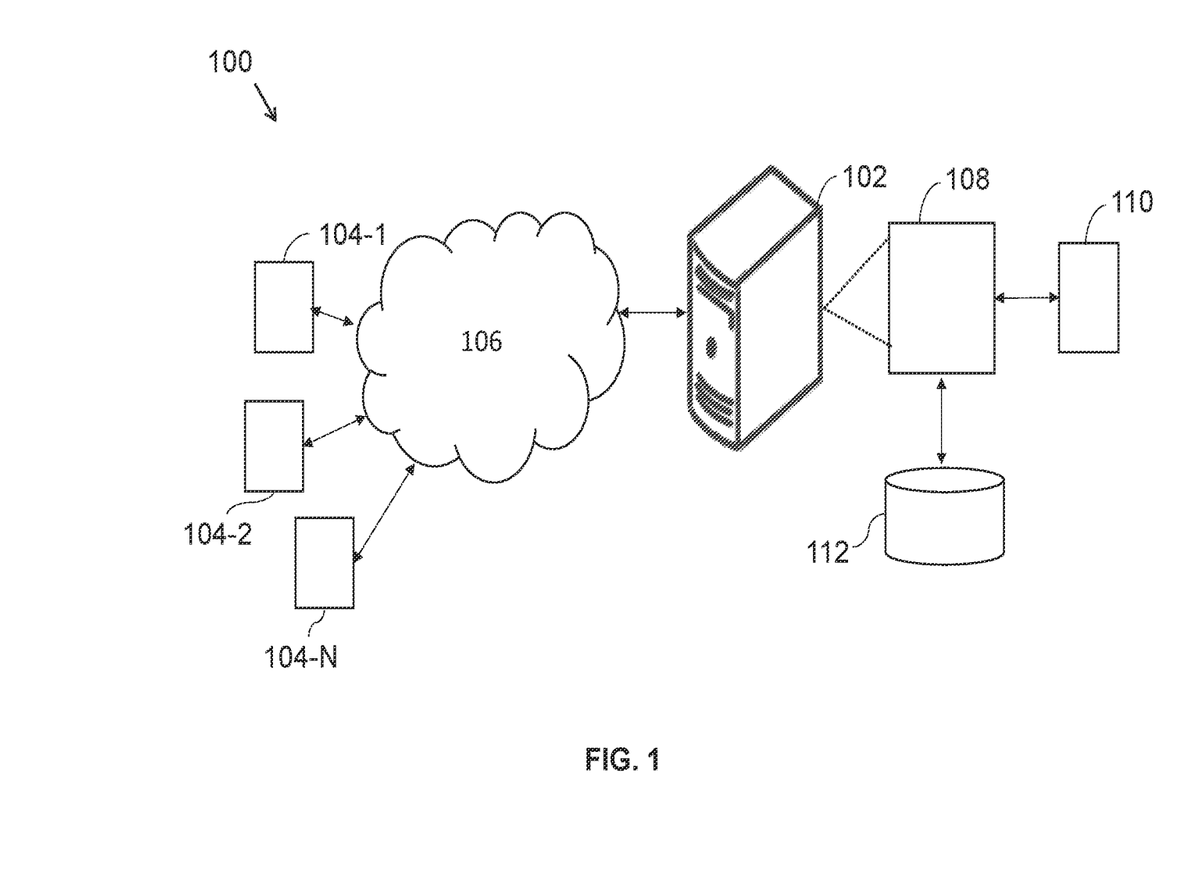
FIG. 1 illustrates a block diagram of an exemplary system that adopts wisdom of crowd manifesting as a super ensemble generative chatbot, in accordance with some embodiments of the present disclosure.
Figure 2:
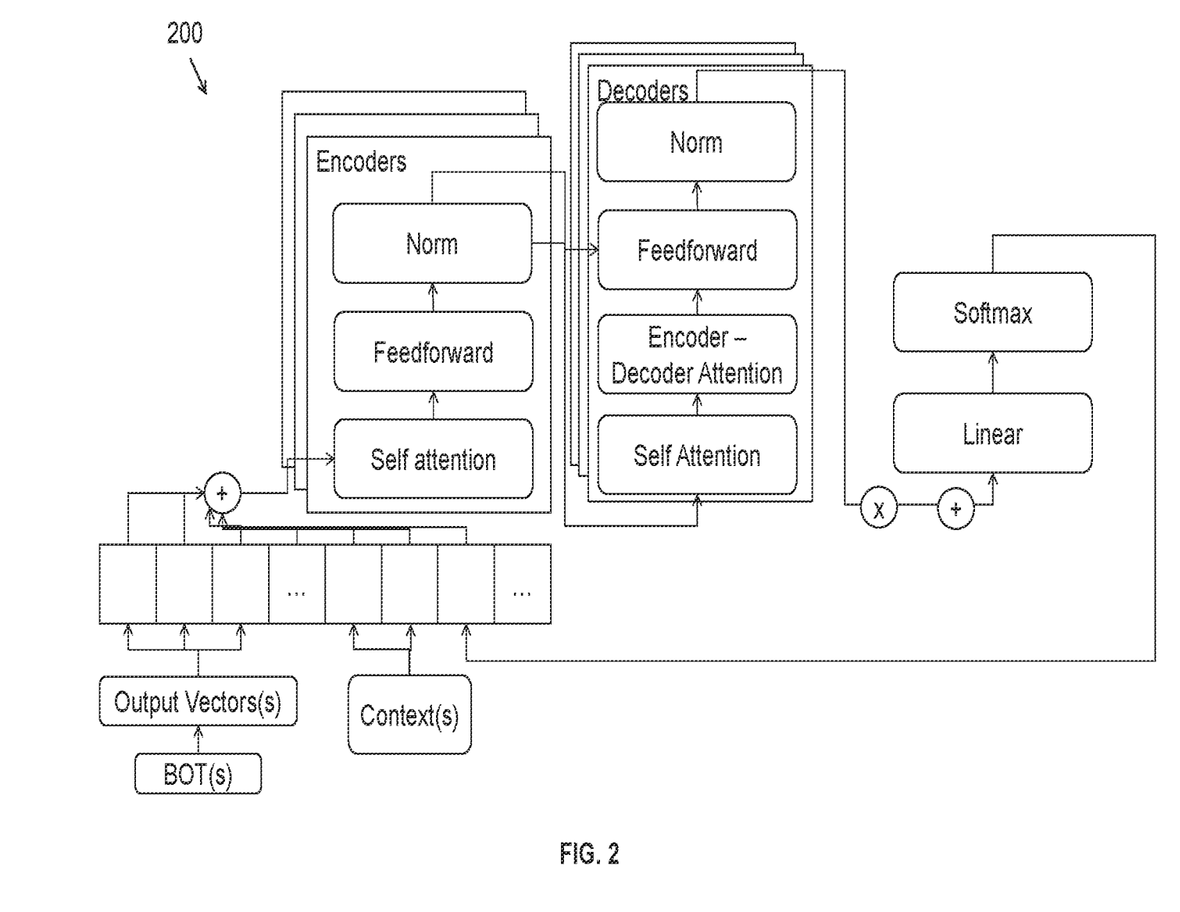
FIG. 2 is a block diagram to illustrate a supercharged ensemble chatbot using a modified context sequence neural network, in accordance with some embodiments of the present disclosure.
Figure 3:
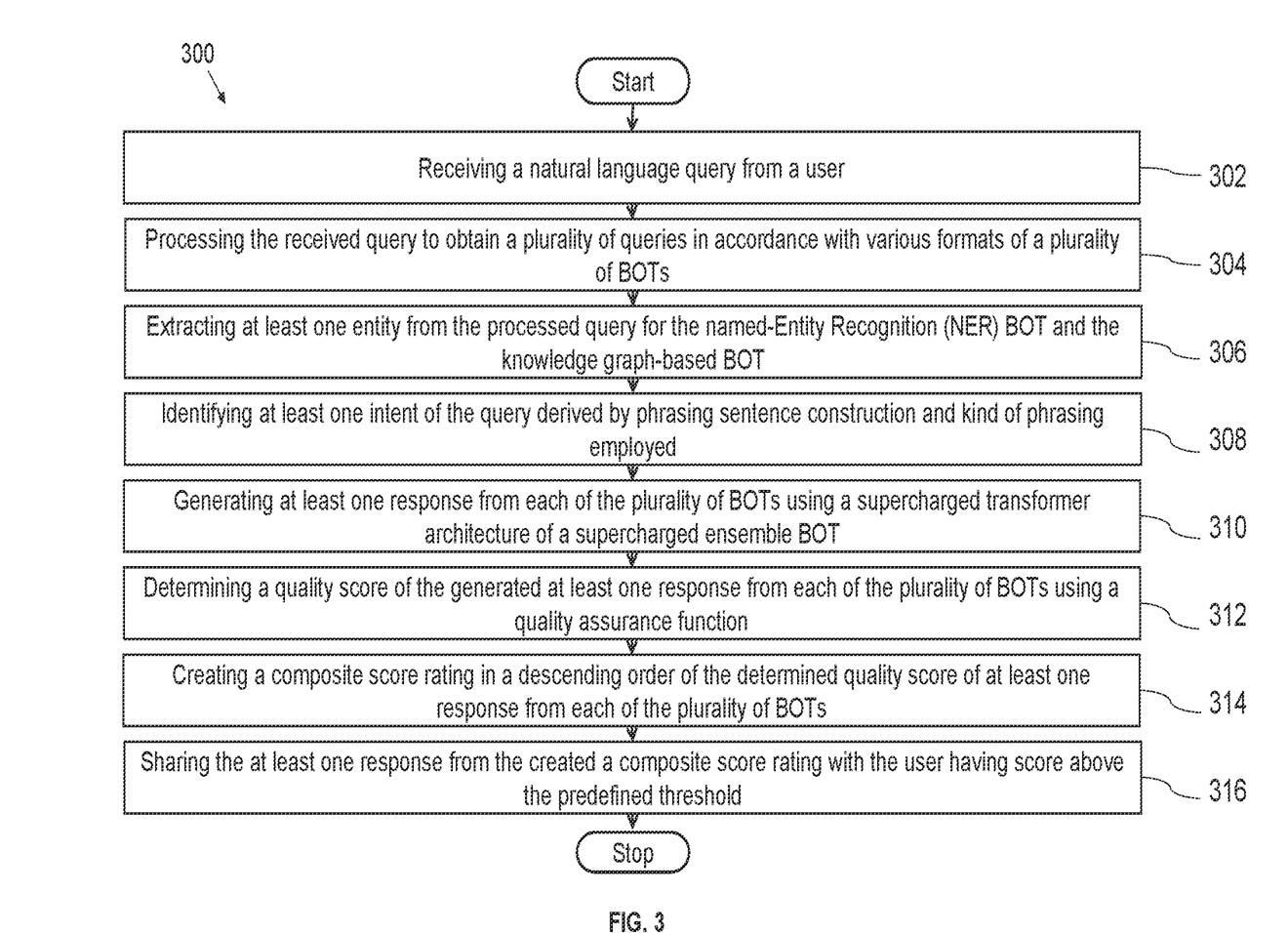
FIG. 3 is a flow diagram to illustrate a processor-implemented method for generating a universal conversational system using an ensemble of chatbots, in accordance with some embodiments of the present disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

FIG. 1 illustrates a block diagram of a universal conversational system (100) that adopts wisdom of crowd manifesting as a super ensemble generative chatbot. Although the present disclosure is explained considering that the system (100) is implemented on a server, it may be understood that the system (100) may comprise one or more computing devices (102), such as a laptop computer, a desktop computer, a notebook, a workstation, a cloud-based computing environment and the like. It will be understood that the system (100) may be accessed through one or more input/output interfaces 104-1, 104-2 . . . 104-N, collectively referred to as I/O interface (104). Examples of the I/O interface (104) may include, but are not limited to, a user interface, a portable computer, a personal digital assistant, a handheld device, a smartphone, a tablet computer, a workstation, and the like. The I/O interface (104) are communicatively coupled to the system (100) through a network (106).

In an embodiment, the network (106) may be a wireless or a wired network, or a combination thereof. In an example, the network (106) can be implemented as a computer network, as one of the different types of networks, such as virtual private network (VPN), intranet, local area network (LAN), wide area network (WAN), the internet, and such. The network (106) may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network (106) may include a variety of network devices, including routers, bridges, servers, computing devices, storage devices. The network devices within the network (106) may interact with the system (100) through communication links.

The system (100) supports various connectivity options such as BLUETOOTH®, USB, ZigBee, and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. Further, the system (100) comprises at least one memory with a plurality of instructions, one or more databases (112), and one or more hardware processors (108) which are communicatively coupled with the at least one memory to execute a plurality of modules (114) therein. The components and functionalities of the system (100) are described further in detail. Herein, the one or more I/O interfaces (104) are configured to receive a natural language query from a user, wherein the query comprising at least one entity. The at least one entity is basically the thing that is consistently talked about or refer to in the natural language query.

In one embodiment, the system (100) is configured to pre-process the received query to obtain a plurality of queries in accordance with the one or more formats of a plurality of chatbots. The plurality of chatbots comprising a named-Entity Recognition (NER) chatbot, a knowledge graph-based chatbot, and a generative chatbot. The named entity recognition (NER) chatbot is one of the most data preprocessing task. It involves the identification of key information in the text and classification into a set of predefined categories. The NER chatbot is a form of natural language processing (NLP). At its core, the NLP is just a two-step process that are involved detecting the entities from the query and classifying them into different categories.

Further, the system (100) is configured to extract at least one entity from the processed query for the NER chatbot and the knowledge graph-based chatbot. The extracted at least one entity is a key subject and a key object of the query, which are domain centric in nature.

In another embodiment, the system (100) is configured to identify at least one intent of the query derived by phrasing sentence construction and kind of phrasing employed.

Intents refer to the emotion behind the query, derived by phrasing how the sentence is constructed, and kinds of phrasing/adjectives employed. Identifying the intent of a piece of text and then labelling the query with task specific named entities. It would be appreciated that the natural language query is wisdom of crowd that is managed by a quality assurance function. The purpose of intent identification is critical to unearth the latent needs behind the query which may not be explicitly mentioned.

In one example, wherein a cap which can be a sleeve type for queries like cap sleeve dress and type for other queries like a cap for full sleeve dress. The query expansion without using NER chatbot and entity specific synonyms can totally change the meaning of above queries. The cap sleeve dress may become (cap|cap_synonyms_fashion) (sleeve|sleeve_synonyms) (dress|dress_synonyms). However, if NER chatbot and entity-specific synonyms is used it would be (cap sleeve|cap_sleeve_sleevetype_synonyms) (dress|dress_product_type_synonyms) where cap_sleeve_sleevetype_synonyms is a synonym for cap sleeve specifically in the context of sleeve type and so on.

The conversational flow model also manages a new novel language training mechanism whereby the all the chatbots are trained online whereby the training model updates the chatbots, whose response was not selected to be presented to the user/customer, with knowledge extracted from the response. The training model may exploit other functions within the conversational flow model like entity extraction or intent identification to prepare the knowledge in a format that will be accepted by respective chatbots (NER based, knowledge graph based, and generative model based).

In another aspect, wherein NER chatbot may require updating of its training base with knowledge in the form of named entities and intents. The knowledge graph may require updating of its training base (i.e., knowledge graph ontologies) with classes, relationships, types, description etc. However, the pre-generative knowledge chatbot uses few shot learners and does not require any pre-preparation.

In another embodiment, the system (100) is configured to generate at least one response from each of the plurality of chatbots using a supercharged transformer architecture of a supercharged ensemble chatbot. The supercharged transformer architecture is a generative chatbot, instead of using query as an input vector, uses the responses (outputs) of ensemble of generative chatbots, knowledge graph-based chatbots and NER chatbots to generate the best fit response as an array of input vectors. This step is iteratively performed till the response is finetuned to address in-domain and out-domain queries as good as a human being would answer.

The supercharged transformer architecture includes a self-attention layer with the encoder, which is a multi-headed attention layer takes positional embeddings of the vector's output from the plurality of chatbots to generate a super ensemble output. The output vector represents the fine-tuned response that is sent to the quality assurance function. It is to be noted that the supercharged chatbot estimates the output, if the output satisfying criteria of user expectations, the output recurses itself and to other chatbots as an input as a knowledge update, this is achieved by scoring response of the plurality of chatbots.

In another embodiment, the system (100) is configured to determine a quality score of the generated at least one response from each of the plurality of chatbots using a quality assurance function. The quality assurance function is a neural network estimating at least one best possible response in a reasonable time. A best fit synthesized response that comes from super ensemble generative chatbots and individual responses from other ensemble chatbots are adjudicated within the quality assurance function of a conversational flow, when all the replies are rated on NLG benchmarks and a composite score is computed individually. The reason is because sometimes the super ensemble may generate a response that may be too complex to be able to address the query.

It would be appreciated that a quality assurance function is always biased in favor of simplicity measured in semantic and syntactic terms. The quality assurance function of conversational flow model then ranks the responses based on descending order of composite benchmark scores and then the response with the highest composite score is selected as the best fit response by the conversational flow model to the customer/user query. In case where all the responses were below an acceptable quality threshold defined within the quality assurance function, the control flow is passed to a human driven chat system whereby a human being provides a response.

In another embodiment, the system (100) is configured to create a composite score rating in a descending order of the determined quality score of at least one response from each of the plurality of chatbots. The quality score is determined by a neural network to estimate whether a response is a suitable response. Gradient decent is optimized balancing log-loss against response-time so that user is not made to wait for a long period of time in the quest for a perfect response. The process not only ranks response on semantic and syntactic control, but also ranks a response worth in terms of what is the contribution towards the domain at large and to the training data set. Both domain contribution and net new knowledge created set as hyper parameters that govern the functioning of the generative chatbots, embedding pair of output from named-Entity Recognition (NER) chatbot, the knowledge graph-based chatbot, generative knowledge chatbot and context chatbot. Hyperparameters are tuned from the quality assurance function to ensure greater control of the response in terms of the semantic and syntactic control.

It is to be noted that storing all the running instances/responses of the plurality of chatbot by a model container orchestrator as a model container instances, where each model container instances implements resource model that specifies input/output, computation and storage needs in runtime. The Model container orchestrator also saves model checkpoints container instances/responses whenever any of the model container instances show a learning rate improvement. Triggering the hot swap if the supercharged ensemble chatbot is taking more time than a probabilistically calculated as expected response time, where the model container orchestrator provides more compute resources in case the resource utilization is high. However, if the utilization is not high, the model orchestrator deems the supercharged ensemble chatbot in the model container instance as unresponsive and executes the hot swap trigger. Furthermore, if the quality assurance function senses deterioration of quality over multiple recursions, it essentially implies that the supercharged ensemble chatbot must be stopped and the previous checkpoint which generated the highest rating may need to be reinstated. In both the scenarios, the model container may trigger the hot swap whereby it is replaced by a selected model container instance with the right checkpoint.

In another embodiment, the system (100) is configured to share the at least one response from the created a composite score rating with the user having score above the predefined threshold. Further, the system (100) is configured to feed the shared at least one response from the created a composite score rating to the plurality of chatbots for a real-time learning using a concurrent model agnostic knowledge function.

Referring FIG. 2, a block diagram (200), illustrating flow of a supercharged ensemble chatbot using modified context sequence neural network, in accordance with some embodiments of the present disclosure. A modified context sequence neural network that takes user context, query vector and focusses on estimating the suitable response given a query/question and vectors of past questions from the end user/customer to generate the suitable response time. The context sequence network is modified to include past query vectors to bias the network against recently asked queries and contexts. The modified context sequence neural network generates a response that is in line with conversational and context history thus assuring predictable user experience rather than estimating responses that are widely divergent from the trend for a user conversational history and context. Every input vector embedding, (embedding pair of output from named-Entity Recognition (NER) chatbot, the knowledge graph-based chatbot, generative knowledge chatbot and context) chatbot is fed to the array of transformer encoders-decoders and results are normalized with activation functions.

Referring FIG. 3, to illustrate a processor-implemented method (300) for a method for generating a universal conversational system using an ensemble of chatbots is provided.

Initially, at step (302), receiving a natural language query from a user, wherein the query comprising at least one entity. At the next step (304), the received query to obtain a plurality of queries in accordance with the one or more formats of a plurality of chatbots. The plurality of chatbots comprising a named-Entity Recognition (NER) chatbot, a knowledge graph-based chatbot, and a generative chatbot. At the next step (306), extracting at least one entity from the processed query for the named-Entity Recognition (NER) chatbot and the knowledge graph-based chatbot. At the next step (308), identifying at least one intent of the query derived by phrasing sentence construction and kind of phrasing employed. At the next step (310), generating at least one response from each of the plurality of chatbots using a supercharged transformer architecture of a supercharged ensemble chatbot. Wherein, the generated at least one response is finetuned to address in-domain and out-domain queries. At the next step (312), determining a quality score of the generated at least one response from each of the plurality of chatbots using a quality assurance function. The quality assurance function is a neural network estimating at least one best possible response in a reasonable time. At the next step (314), creating a composite score rating in a descending order of the determined quality score of at least one response from each of the plurality of chatbots. At the last step (316), sharing the at least one response from the created a composite score rating with the user having score above the predefined threshold.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the problem of serving the response for any kind of user query without any bounds by concurrently executing and choosing the best response amongst three different kinds of Natural Language Processing (NLP)/Natural Language Understanding (NLU)/Natural Language Generation (NLG) based models. The NLP based model focused on Named Entity Extraction and matching entity to stored responses. The NLU based model focusses on processing entities in context through a knowledge graph that can handle more complex queries. The NLG based model handles any query by assimilating the knowledge from the NLP based model and the NLU based model and generates contextual language to the extent possible by blending pre-trained knowledge gleaned from open data sets and domain specific knowledge challenges in existing models.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives. CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising steps of:
receiving, via an input/output interface, a natural language query from a user, wherein the natural language query comprising at least one entity;
processing, via one or more hardware processors, the received natural language query to obtain a plurality of queries in accordance with the one or more formats of a plurality of chatbots, wherein the plurality of chatbots comprising a named-Entity Recognition (NER) chatbot, a knowledge graph-based chatbot, and a generative chatbot;
extracting, via the one or more hardware processors, at least one entity from the processed query for the named-Entity Recognition (NER) chatbot and the knowledge graph-based chatbot;
identifying, via the one or more hardware processors, at least one intent of the query by phrasing sentence construction and a kind of phrasing employed;
generating, via the one or more hardware processors, at least one response from each of the plurality of chatbots using a supercharged transformer architecture of a supercharged ensemble chatbot, wherein the generated at least one response is finetuned to address in-domain and out-domain queries;
determining, via the one or more hardware processors, a quality score of the generated at least one response from each of the plurality of chatbots using a quality assurance function, wherein the quality assurance function is a neural network estimating at least one best possible response in a predefined time;
creating, via the one or more hardware processors, a composite score rating of the determined quality score of at least one response from each of the plurality of chatbots; and sharing, via the input/output interface, the at least one response from the created composite score rating with a user having the quality score above a predefined threshold feeding, via the one or more hardware processors, the shared at least one response from the created composite score rating to the plurality of chatbots for a real-time learning; and
storing, via the one or more hardware processors, the at least one response of the plurality of chatbot to a model container orchestrator as a model container instance, wherein each model container instance implements a resource model that specifies input/output, computation and storage needs in runtime.

2. The processor-implemented method of claim 1, wherein the extracted at least one entity is a key subject and a key object of the query.

3. The processor-implemented method of claim 1, wherein if the estimated quality of the at least one response is below the predefined threshold, the control flow is passed to a human driven chat system to provide response.

4. The processor-implemented method of claim 1, wherein the supercharged transformer architecture includes a self-attention layer of an encoder, which is a multi-headed attention layer takes positional embeddings of the vector's output from the plurality of chatbots to generate a super ensemble output.

5. A system comprising:
an input/output interface to receive a natural language query from a user, wherein the natural language query comprising at least one entity;
a memory in communication with the one or more hardware processors, wherein the one or more hardware processors are configured to execute programmed instructions stored in the memory to:
process the received natural language query to obtain a plurality of queries in accordance with the one or more formats of a plurality of chatbots, wherein the plurality of chatbots comprising a named-Entity Recognition (NER) chatbot, a knowledge graph-based chatbot, and a generative chatbot;
extract at least one entity from the processed query for the named-Entity Recognition (NER) chatbot and the knowledge graph-based chatbot;
identify at least one intent of the query by phrasing sentence construction and kind of phrasing employed;
generate at least one response from each of the plurality of chatbots using a supercharged transformer architecture of a supercharged ensemble chatbot, wherein the generated at least one response is finetuned to address in-domain and out-domain queries;
determine a quality score of the generated at least one response from each of the plurality of chatbots using a quality assurance function, wherein the quality assurance function is a neural network estimating at least one best possible response in a predefined time;
create a composite score rating of the determined quality score of at least one response from each of the plurality of chatbots; and
share the at least one response from the created the composite score rating with a user having the quality score above a predefined threshold
feeding, via the one or more hardware processors, the shared at least one response from the created a composite score rating to the plurality of chatbots for a real-time learning; and
storing, via the one or more hardware processors, the at least one response of the plurality of chatbot by a model container orchestrator as a model container instance, wherein each model container instance implements resource model that specifies input/output, computation and storage needs in runtime.

6. The system of claim 5, wherein the estimated quality of the at least one response is below the predefined threshold, the control flow is passed to a human driven chat system to provide response.

7. The system of claim 5, wherein the supercharged transformer architecture includes a self-attention layer of an encoder, which is a multi-headed attention layer takes positional embeddings of the vector's output from the plurality of chatbots to generate a super ensemble output.

8. A non-transitory computer readable medium storing one or more instructions which when executed by one or more processors on a system, cause the one or more processors to perform method comprising:

receiving, via an input/output interface, a natural language query from a user, wherein the natural language query comprising at least one entity;

processing, via one or more hardware processors, the received natural language query to obtain a plurality of queries in accordance with the one or more formats of a plurality of chatbots, wherein the plurality of chatbots comprising a named-Entity Recognition (NER) chatbot, a knowledge graph-based chatbot, and a generative chatbot;

extracting, via the one or more hardware processors, at least one entity from the processed query for the named-Entity Recognition (NER) chatbot and the knowledge graph-based chatbot;

identifying, via the one or more hardware processors, at least one intent of the query by phrasing sentence construction and a kind of phrasing employed;

generating, via the one or more hardware processors, at least one response from each of the plurality of chatbots using a supercharged transformer architecture of a supercharged ensemble chatbot, wherein the generated at least one response is finetuned to address in-domain and out-domain queries;

determining, via the one or more hardware processors, a quality score of the generated at least one response from each of the plurality of chatbots using a quality assurance function, wherein the quality assurance function is a neural network estimating at least one best possible response in a predefined time;

creating, via the one or more hardware processors, a composite score rating of the determined quality score of at least one response from each of the plurality of chatbots; and sharing, via the input/output interface, the at least one response from the created composite score rating with a user having the quality score above a predefined threshold feeding, via the one or more hardware processors, the shared at least one response from the created composite score rating to the plurality of chatbots for a real-time learning; and storing, via the one or more hardware processors, the at least one response of the plurality of chatbot to a model container orchestrator as a model container instance, wherein each model container instance implements a resource model that specifies input/output, computation and storage needs in runtime.

\* \* \* \* \*